March 15, 1966  BUNZO HIRANO  3,240,305
AUTOMATIC CLUTCH

Filed Nov. 3, 1961  3 Sheets-Sheet 1

INVENTOR
BUNZO HIRANO

BY
ATTORNEY

INVENTOR
BUNZO HIRANO

BY
ATTORNEY

March 15, 1966  BUNZO HIRANO  3,240,305
AUTOMATIC CLUTCH

Filed Nov. 3, 1961  3 Sheets-Sheet 3

INVENTOR.
BUNZO HIRANO
BY *Otto John Munz*
Attorney

United States Patent Office
3,240,305
Patented Mar. 15, 1966

3,240,305
AUTOMATIC CLUTCH
Bunzo Hirano, 539 Nishinoshima, Toyotamura,
Iwata-gun, Shizuoka Prefecture, Japan
Filed Nov. 3, 1961, Ser. No. 150,077
Claims priority, application Japan, Dec. 3, 1960,
35/47,699
7 Claims. (Cl. 192—69)

This invention relates to an automatic friction clutch characterized by being operated so that the force pressing the friction faces into engagement is varied in proportion to the load on the driven member.

Automatic clutches or specifically clutches to be used for motor cycles are usually by centrifugal friction clutches and centrifugal electromagnetic clutches which are engaged with a force related to the number of revolutions of the engine. As the output of an engine is substantially proportional to the number of revolutions of the engine, a torque proportional to the output will be transmitted and the clutch will be of reasonable dimensions. However, in starting with a large load and on an upgrade, if the clutch is engaged at the same fixed engine output (number of revolutions) as on a flat road, the output will be so low as to cause the engine to stop. Further, in quick starting, the output is required to be so high that, in this type of clutch which is to be engaged at a fixed number of revolutions, the vehicle will be accelerated after the clutch is engaged and therefore the output will be naturally insufficient. Pushing starting, kicking starting (when the kicking device is located behind the clutch) or engine braking cannot be carried out with the usual type of clutch, causing various inconveniences.

An object of the present invention is to carry out upgrade start and quick start smoothly under a high output after acceleration by detecting such load resistance and acceleration resistance of the driven shaft as are mentioned above not in relation to the number of revolutions of the engine but in relation to the output of the engine so that the amount of transmission of torque by the clutch may be properly decereased.

The drawings illustrate embodiments of the present invention.

Figure 1:
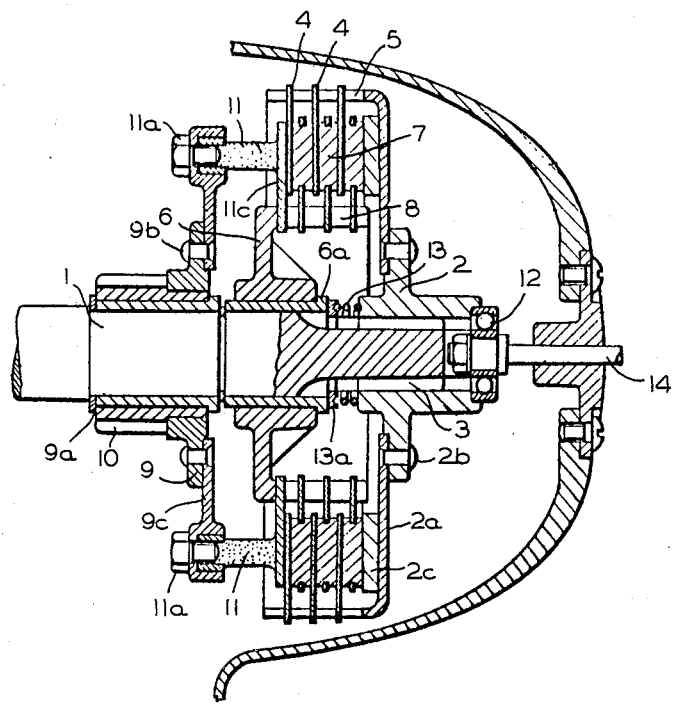
Figure 6:
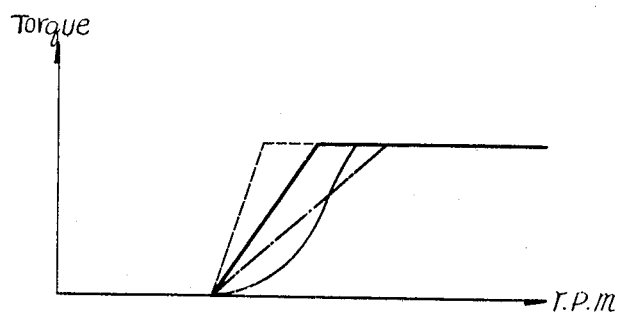
Figure 7:
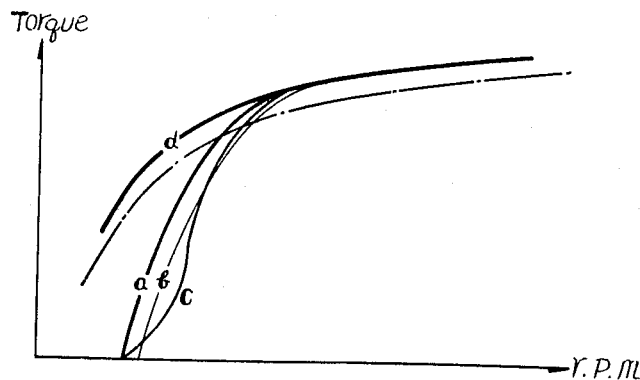

FIGURE 1 is a vertically sectioned side view.
FIGURE 2 to 5 are diagrammatic sketches showing various other embodiments of the present invention.
FIGURE 6 and 7 are diagrams.

In the drawings, 1 is a driving shaft at the forward end of which is engaged and borne through a spline 3 or the like a hub 2 so as to be rotatable integrally with the driving shaft and slidable axially. A cylindrical driving member or cup 2a has a central aperture in its base or web, riveted as at 2b to the flange of hub 2. This member has in its cylindrical walls, two diametrically opposite slots 5 extending parallel with the axis of shaft 1. Radial projections from the rims of a plurality of friction plates 4, shown as three in number, have a smooth fit in each of the aforesaid slots, so that the plates may have limited translation axially of shaft 1, but are constrained to rotate as a unit therewith.

A second or driven cylindrical member or cup 6 has a hub journaled on shaft 1, by means of a bushing 6a for limited axial movement relatively to the shaft. The cylindrical walls of this hub are positioned within those of member 2a and are likewise provided with axially-extending, diametrically opposite slots 8.

Each of a number of friction rings 7, shown as three in number is interposed between each successive pair of plates 4. Each ring 7 comprises a flat annulus of friction material to which is fixed, in a plane between its frictional faces, a pair of diametrically opposite, radially inward metallic projections, each having a smooth fit within a respective one of the aforesaid slots 8. The final one of rings 7, that is, the one at the right, as viewed upon FIG. 1, lies between a ring 4 at its left, and at its right, an annular plate 2c of friction material fixed to the web or base of member 2a, coaxially of shaft 1.

A flanged hub 9 having integrally fixed therewith a drive pinion 10, is journaled upon shaft 1, as by means of bushing 9a. The flange of this hub 9 is secured, as by rivets 9b, to a web or driven plate 9c. The hub and its plate are fixed against axial movement with respect to shaft 1. A number of elastic or resilient elements 11 such as rods of rubber, each has one end fixed as at 11a to plate 9c radially outward of the axis of shaft 1, and extends parallel with the shaft. The other end of each elastic element is fixed to an annular plate 11c, also connected with member 6 for rotation as a unit therewith. A clutch-operating rod 14 is aligned with shaft 1 and is axially movable to act through a trust bearing 12, to apply a force urging hub 2 to the left, FIG. 1, to thereby force or urge the friction plates 4 and 7 together and thus effect transmission of power from shaft 1 to pinion 10. A coil spring 13 surrounds the splined end of shaft 1 and acts, in an obvious way, between a collar 13a and the adjacent end of hub 2, to reduce frictional contact between the plates when there is no force applied to rod 14.

It is the elastic bodies 11 that will retain the driven friction plates 7 when the driving friction plates 4 are in a fixed position under a fixed pressing force. This compressing load is a pressing force for the friction plates. Therefore, the torque will be transmited in relation to the compressive stress of the elastic body 11. The rotation of the gear 10 will follow the driven friction plates 7 substantially integrally through the elastic bodies 11. Here, if a resistance is added to the gear 10, bodies 11 will be twisted to produce a shearing stress will be naturally produced in the elastic bodies 11 transmitting the rotation. The twisting is produced by the relative angular movement of plates 9C and 11C to which are fixed the ends of the elastic bodies. The shearing stress will reduce the compressive stress, the above mentioned friction plate pressing force will decrease and the amount of transmitted torque will decrease. That is to say, in relation to the magnitude of the resistance of the driven shaft, the amount of torque transmission will decrease.

Figure 2:
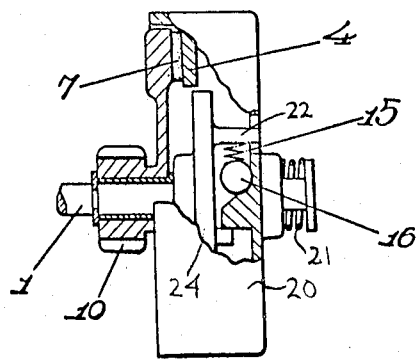
Figure 4:
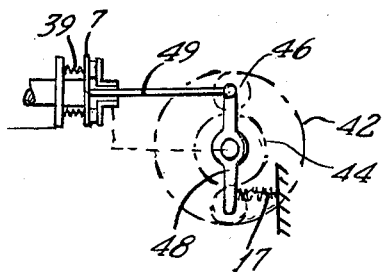
Figure 3:
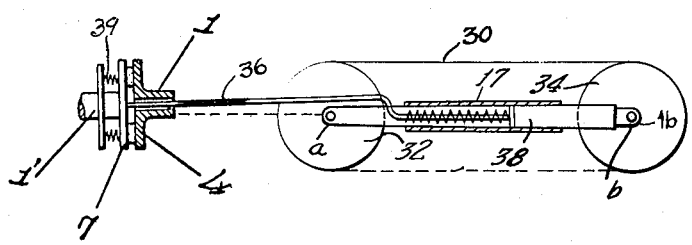

FIGURES 2 to 4 show various embodiments operating in the same manner. In FIGURE 2, a ball 16 pressed by a spring 15 is kept in contact with a surface inclined in the axial direction and integral with a member 20. The member 20 is urged to the left as viewed in FIG. 2 by a spring 21 to thereby engage friction plates 4 and 7 with a predetermined force. An arm 22 integral with a flange 24 fixed to shaft 1 serves to transmit the drive from the shaft through the spring to the ball. When the transmitted torque exceeds a predetermined value the ball acting on the inclined surface urges member 20 to the right against the force of spring 21 to thereby reduce the pressure between plates 4 and 7 and limit the torque transmitted to the driven member.

In FIGURE 3, the distance between axes $a$ and $b$ is made free to extend and contract and a chain belt 30 is trained about sprockets 32 and 34 carried by shafts 1 and 1b mounted to rotate about axes "$a$" and "$b$" respectively. A chain tightener mechanism indicated by the numeral 17 serves to tighten the chain and is provided with a rod 36 contacting plate 7 at one end and fixed to telescoped member 38 at the other end. As the torque load transmitted by sprocket 34 increases beyond a predetermined value the tightener is shortened to move shaft 1b toward shaft 1 and rod 36 urges plate 7 away from plate 4 to thereby reduce the pressure on the friction faces produced by springs 39. The reduction of the force between the friction faces limits the torque transmitted to shaft 1' to the predetermined value.

FIGURE 4 is of exacly the same as in the above mentioned case and the displacement on the arc is replaced with planetary gears. An internal gear 42 is connected to a power source and an external gear 44 is connected to shaft 1. A pair of gears 46 in engagement with gears 42, 44 are mounted on an arm 48 which is spring connected to a fixed support by a spring 17'. A rod 49 is secured to the arm 48 at one end and contacts plate 7 at the other. In operation gear 42 drives gear 44 through gears 46. Upon an increase of driving torque beyond a predetermined value, arm 48 is rotated against the force of spring 17' and rod 49 urges plate 7 away from plate 4 to thereby limit the torque transmitted by the clutch to driven shaft 1'.

Figure 5:
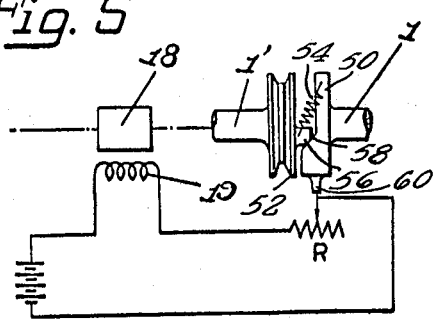

FIGURE 5 shows a type of electromagnetic clutch 18 wherein a torque is transmitted which is proportional to the intensity of the current flowing to its exciting coil 19. The current is varied by varying the resistance R in a circuit containing coil 19. As shown in FIGURE 5, an increase in load sufficient to force member 50 away from clutch element 52 against the force of spring 54 by the camming of projection 56 on the inclined surface 58 of the member 50 will move contact carrying arm 60 along the resistance R.

In each of the above, the amount of transmitted torque will decrease in relation to the magnitude of the resistance of the driven shaft.

The operation of the present clutch shall be described in detail with reference to embodiments as used chiefly for motor cycles.

First of all, in case a driving shaft is rotating at a fixed output (a fixed number of revolutions), if the present clutch is operated momentarily (by pressing the friction plates into contact with each other by quickly pushing the operating rod in the embodiment in FIGURE 1), the driven shaft will momentarily tend to be accelerated to the same number of revolutions as of the driving shaft and therefore the reaction of the driven shaft will be an inverse function of time and will be very large. That is to say, in order that the driven shaft may rotate at the same number of revolutions as of the driving shaft, an energy is necessary. In order that this energy may be given to the driven shaft within a short time, a large force is necessary. If the driving shaft in such case has a sufficient energy, it will be all right. However, if the energy is not sufficient, the driving shaft will stop or will be decelerated (by shocking). In an ordinary clutch, the reaction of the driven shaft in such case will occur in relation to all the mass and various resistances on the driven side. In the present clutch, such reaction will not be larger than shearing stress of the elastic body. That is to say, even in the maximum case, the reaction will not be larger than the shearing stress necessary to completely separate the friction plates of the clutch at the pressing force at that time, because, when an energy is poured into the driven shaft, the clutch plates will open to the maximum completely separated state. (This shearing force will be added to the driven shaft and, if the resistance of the driven shaft is less than that, needless to say, the driven shaft will be rotated.) Therefore, the energy required at this time may be only the shearing force and will be cushioned by the elastic body and will not become shocks. The moment the friction plates open, the reaction of the driven shaft will vanish (or the transmitted torque will decrease and the reaction will also decrease), therefore the shearing stress will also vanish (reduce), the friction plates will be pressed into contact and the clutch will be engaged. The shearing force will act again due to the reaction of the driven shaft. Due to the repetition of this, the energy will be gradually poured into the driven shaft. In fact, in a balanced state instead of such repeated extreme vibrating state, the friction plates will be pressed into contact and the pressing force will gradually increase. That is to say, the rotation will be gradually transmitted to the driven shaft and the difference between the number of revolutions of the driven shaft and that of the driving shaft will decrease. Therefore, the acceleration resistance will reduce gradually and the pressing force or the clutch capacity will increase gradually. Such state is as shown in the diagram in FIGURE 6. This forms the fundamental operating characteristics of the present clutch.

The factors to vary said characteristics are the pressing force for the driving base plate, such pouring-in velocity as is mentioned above, the relative ratio between the shearing stress and compressive stress (or between the component in the rotating direction and that in the axial direction), the number of revolutions of the driving shaft and the load on the driven shaft. When the pressing force is strong, the characteristics will rise as shown by the dotted line in the diagram. When it is weak, they will lie as shown by the chain line. If the pressing force is gradually increased, the curve will be slow at first and will become steep later as shown by the fine line. This can be said to be of a velocity for adding a fixed pressing force. The curve will rise if the velocity is high and will lie if it is low. But said curve will not rise above the adjacent curve of characteristics. (In applying this, centrifugal rollers had better be provided.) The higher the number of revolutions of the driving shaft, the steeper the rise. The larger the load on the driven shaft, the slower the rise.

In case it is actually utilized for motor cycles, it will be completely automatic due to the cooperation with centrifugal rollers. Needless to say, it may be of a manually operated type. Just in motor cycles, the engine output will be proportional to the number of revolutions and, therefore, the number of revolutions at which the clutch is to be engaged by the roller must be larger than the number of revolutions at which the output can give a shearing stress for the elastic body necessary to completely disengage the clutch when an infinite resistance is added to the driven shaft. The case of the manual operation is the same. Therefore, most of the above mentioned functions will be set. Variable according to the condition are the load resistance and acceleration resistance. The load resistance will depend on the amount of load and the gradient of the running road. When the load resistance is large, due to the slow characteristics, that is, as the time until the clutch is engaged will be longer than at the time of a low load, the engine output will be able to be quickly elevated (under the low load) meanwhile and the vehicle will be able to be started at a high output. As mentioned above, the acceleration resistance depends on the time of pouring in the centrifugal force or the pressing force, that is, on the state of accelerating the engine. This relates to the feed of gasoline and is a matter of the intention of the driver. When the throttle grip is rotated quickly, the required number of revolutions will be quickly reached, that is to say, the fundamental characteristics will be approached. Further, due also to the fact that the number of revolutions can be quickly increased, the vehicle can be started more quickly than for the characteristics. Needless to say, if the grip is rotated slowly, the vehicle will start slowly.

In the case of the manual operation, the number of revolutions for engaging the clutch will be free and therefore the start will be free to be slow or quick. The characteristics at the number of revolutions are the basis. In such case, if the pressing force is increased (may be steppedly) in relation to the throttle lever, the clutch will be an automatic clutch smoother than of the centrifugal rollers.

Shown in FIGURE 7 are these states. A is of the ordinary start. B is of the climbing and loaded cases. C is of the quick start. In short, the pressing force poured into the friction plates will not act as it is but will be reduced in accordance with the condition of the driven shaft. That is to say, the number of revolutions for engaging the clutch will become higher (for a higher output).

At the time of the constant speed operation and deceleration after starting, the resistance will have become much smaller than at the time of starting and, therefore, the clutch will remain substantially fully engaged until below the number of revolutions for engaging the clutch. (See line C in the diagram.) Therefore, the low speed running in a state wherein the clutch does not slip is possible. It is also possible to use the engine brake.

As described above, in the clutch of the present invention, when the rotary torque of the driving shaft comes to be reduced by the resistance of the driven shaft, the clutch will be moved to be disengaged in accordance with the degree of the reduction of the torque and, when the load is reduced, the clutch will come to be engaged. Therefore, the clutch operation is ideal.

Specifically, at the time of starting, the resistance by acceleration will be very large, the engine output will be proportional to the number of revolutions and therefore a high speed rotation will be necessary. Thus the accelerating resistance and engine output will be reverse to each other with respect to the number of revolutions at the time of starting. Therefore, in a word, in the present clutch wherein, the larger the accelerating resistance, the larger the degree of disengagement of the clutch will be, the engine can be accelerated in the state of a low load, the necessary output can be directly obtained without causing such troubles as engine stop and therefore the start of the vehicle is reasonable. It is exactly the same as gradually starting the vehicle under a high rotation in a conventional manual clutch. It can be said that the centrifugal ball is related with the number of revolutions of the engine and that the present clutch is related with the necessary output. It is carried out in response to the amount of the carried load and the degree of the sloped road. Thus, the effect as of a centrifugal clutch is very large.

As soon as the brake is applied, the clutch will be effectively disengaged because of the resulting decrease of pressure between friction plates 4 and 7. At the time of acceleration, the maximum engagement of the clutch will be obtained and therefore, such treatments as engine braking, pushing engagement and kicking starting can be simply applied. In the claims, the term "normally" as used with reference to rods 11, means their position when substantially no torque is being transmitted to pinion 10.

Needless to say, the price can be reduced. Thus, this is an automatic clutch characterized by ideal effects.

What I claim is:

1. In a friction clutch, a driving shaft, a driven member journaled coaxially about said shaft, a first friction element mounted on and for rotation as a unit with said shaft, a second friction element journaled on said shaft, a plurality of elastic elements connecting said second friction element with said driven member, in normally parallel, radially offset relation with respect to said shaft, twisting of said elements in either direction in response to torque transmitted from said shaft to said driven element tending to separate said friction elements, and means operable to urge said first element axially of said shaft into frictional contact with said second element against compressive resistance of said elastic elements.

2. The clutch of claim 1, and spring means acting between said friction elements urging them apart axially of said shaft.

3. In a self-adjusting friction clutch, a driving shaft, a driven member journaled on said shaft, first and second interengageable friction rings coaxial of and about said shaft and having limited axial translation therealong, means connecting said first ring for rotation as a unit with said shaft, means journaling said second ring on said shaft, a plurality of rods of elastic material in normally parallel, radially offset relation with said shaft, each said rod having its ends fixed with said second ring and driven member, respectively, and means operable to force said rings into frictional driving contact and simultaneously compressing said rods.

4. In an automatic friction clutch, a driving shaft having an axis of rotation, a driven element journaled on said shaft, a first set of friction elements connected with said shaft for rotation as a unit therewith and coaxially thereof, a second set of friction elements connected for rotation as a unit on and with respect to said shaft, each element of said first set being interposed between a contiguous pair of elements of said second set, all of said elements being translatable axially of said shaft, a plurality of elastic rods parallel with and radially offset from said shaft, means connecting one end of each said element to said second set of elements, means connecting the other ends of each said rod to said driven element, and means operable to urge said friction elements into contact axially of said shaft against the compressive resistance of said rods.

5. In a friction clutch, a driving shaft having an axis of rotation, a driven element journaled on said shaft, first and second sets of friction rings coaxially of said axis, each ring of said first set being interposed between a contiguous pair of rings of said second set, means mounting the rings of said first set for rotation as a unit with said shaft and for limited axial translation relatively thereto, means mounting the rings of said second set for rotation as a unit on said shaft and for limited axial translation relatively thereto, a plurality of rods of elastic material equiangularly spaced about said axis in parallel radially offset relation therewith, means connecting one end of each rod for rotation as a unit with the rings of said second set, means connecting the other end of said rods for rotation as a unit with said driven element, and means operable to urge said plates axially into contact against the compressive resistance of said rods.

6. A friction clutch comprising, a driving shaft, a hub mounted on said shaft for rotation as a unit therewith and for axial translation relatively thereto, a first cup fixed to said hub with its cylindrical wall coaxially of said shaft, a second cup mounted within said first cup and journaled on said shaft, there being a plurality of slots in the cylindrical wall of each said cup, and parallel with said shaft, first and second opposed friction plates fixed with said first and second cups, respectively, coaxially of said shaft, a first set of friction rings between said plates, coaxially of said shaft, including a plurality of outward radial projections each fitting a respecive slot of said first cup, a second set of friction rings between said plates coaxially of said shaft, including a plurality of inward radial projections each filling a respective slot of said second cup, each ring of said first set being interposed between a contiguous pair of rings of said second set, a driven member journaled on said shaft, a plurality of rods of resilient material in uniformly spaced, radially offset relation about and with respect to said shaft, each said rod having one end fixed to said second plate and its other end to said driven member, said rods being normally parallel with said shaft, and means operable to force said hub and first cup toward said driven member relatively to said shaft.

7. The clutch of claim 6, said rods being of rubber.

References Cited by the Examiner

UNITED STATES PATENTS

| | | | |
|---|---|---|---|
| 754,644 | 3/1904 | Davis | 192—96 |
| 1,044,894 | 11/1912 | Leonard. | |
| 1,118,132 | 11/1914 | Jones. | |
| 2,214,901 | 9/1940 | Griffin | 192—84 |
| 2,717,674 | 9/1955 | Crichton | 192—96 X |
| 2,718,157 | 9/1955 | Schaub | 192—21.5 |
| 2,759,580 | 8/1956 | Bower | 192—21.5 |

FOREIGN PATENTS 336,560 10/1930 Great Britain.

DON A. WAITE, *Primary Examiner.*

DAVID J. WILLIAMOWSKY, *Examiner.*